United States Patent
de Vos et al.

(10) Patent No.: US 10,382,247 B2
(45) Date of Patent: *Aug. 13, 2019

(54) SYSTEM AND METHOD FOR MANAGING CONTENT

(71) Applicant: International Business Machines Corporation, Armonk, NY (US)

(72) Inventors: David A. de Vos, Melrose Park (AU); William J. Izard, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/067,059

(22) Filed: Oct. 30, 2013

(65) Prior Publication Data

US 2014/0214774 A1 Jul. 31, 2014

Related U.S. Application Data

(63) Continuation of application No. 13/750,368, filed on Jan. 25, 2013.

(51) Int. Cl.
| | |
|---|---|
| G06F 15/16 | (2006.01) |
| H04L 29/02 | (2006.01) |
| G06F 16/958 | (2019.01) |
| H04L 29/08 | (2006.01) |

(52) U.S. Cl.
CPC ............ *H04L 29/02* (2013.01); *G06F 16/958* (2019.01); *H04L 67/02* (2013.01)

(58) Field of Classification Search
CPC .......................... H04L 29/02; G06F 17/30312
USPC ........................................................ 709/217
See application file for complete search history.

(56) References Cited

U.S. PATENT DOCUMENTS

| | | | |
|---|---|---|---|
| 8,311,382 B1 | 11/2012 | Harwell et al. | |
| 8,732,605 B1* | 5/2014 | Falaki | ........................... 715/780 |
| 2003/0018491 A1* | 1/2003 | Nakahara | ................ G06F 21/10 |
| | | | 705/59 |
| 2007/0118803 A1* | 5/2007 | Walker | .............. G06F 17/30855 |
| | | | 715/744 |

(Continued)

OTHER PUBLICATIONS

IBM Software, IBM WebSphere Portal and Web Content Manager Version 8.0, ftp://ftp.software.ibm.com/common/ssi/ecm/en/lob14007usen/LOB14007USEN.PDF, Nov. 2012, pp. 1-44.

(Continued)

*Primary Examiner* — Ramy M Osman
*Assistant Examiner* — Sm Z Islam
(74) *Attorney, Agent, or Firm* — Brian J. Colandreo, Esq.; Jeffrey T. Placker, Esq.; Holland & Knight LLP

(57) ABSTRACT

A method, computer program product, and computer system for assigning an action to execute on content based upon, at least in part, an occurrence of a statistical event. Statistics associated with a corresponding portion of the content published on one or more websites is received. The occurrence of the statistical event with respect to the corresponding portion of the content is determined based upon, at least in part, receiving the statistics. The action on the content is executed based upon, at least in part, determining the occurrence of the statistical event with respect to the corresponding portion of the content.

6 Claims, 5 Drawing Sheets

(56) References Cited

U.S. PATENT DOCUMENTS

| | | | |
|---|---|---|---|
| 2008/0066125 A1* | 3/2008 | Li | H04N 7/165 725/97 |
| 2008/0307454 A1* | 12/2008 | Ahanger | G06Q 30/02 725/36 |
| 2009/0061764 A1* | 3/2009 | Lockhart | G06F 17/30017 455/3.06 |
| 2010/0192187 A1* | 7/2010 | Toebes | H04N 7/17318 725/87 |
| 2011/0213670 A1* | 9/2011 | Strutton | G06Q 30/02 705/14.73 |
| 2011/0314101 A1 | 12/2011 | Redmon et al. | |
| 2012/0010995 A1 | 1/2012 | Skirpa et al. | |
| 2012/0011432 A1 | 1/2012 | Strutton | |
| 2012/0059722 A1 | 3/2012 | Rao | |
| 2012/0197718 A1 | 8/2012 | Martchenko et al. | |
| 2012/0209999 A1* | 8/2012 | Chen-Quee | G06F 21/6218 709/225 |
| 2013/0117392 A1 | 5/2013 | Aceves | |
| 2014/0052823 A1* | 2/2014 | Gavade | H04N 21/2541 709/219 |
| 2014/0351257 A1* | 11/2014 | Zuzik | 707/740 |
| 2015/0058750 A1* | 2/2015 | Chakra | G06Q 50/01 715/753 |

OTHER PUBLICATIONS

Steiner, "IBM Web Content Manager Social Media Publisher v1.0 Available on the Solutions Catalog," http://www-10.lotus.com/ldd/portalwiki.nsf/dx/IBM_Web_Content_Manager_Social_Media_Publisher_v1.0_available_on_the_Solutions_Catalog, downloaded on Jan. 30, 2013, pp. 1.

IBM Software, IBM WebSphere Portal and Web Content Manager Version 8.0, ftp://ftp.software.ibm.com/common/ssi/ecm/en/1ob14007usen/LOB14007USEN.PDF, Nov. 2012, pp. 1-44.

Byrne, "Real Story Group. Make Better Technology Decisions," http://www.realstorygroup.com/Blog/1676-Twitter-Facebook-and-your-Web-CMS, downloaded Jan. 30, 2013, pp. 1-14.

Steiner, "IBM Web Content Manager Social Media Publisher v1.0 Available on the Solutions Catalog," http://www-10.lotus.com/ldd/portalwiki.nsf/dx/IBM_Web_Content_Manager_Social_Media_Publisher_v1.0_available_on_the_Solutions_Catalog, downloaded on Jan. 30, 2013, pp. 1.

"Social Channels: A Content Management Imperative, How Enterprise Social Content Management Provides a Competitive Edge for Success," http://www2.onehippo.com/binaries/content/assets/pdf+downloads/social-channels—a-content-management-imperative.pdf, 2012, downloaded Jan. 30, 2013, pp. 1-12.

* cited by examiner

SYSTEM AND METHOD FOR MANAGING CONTENT

RELATED APPLICATIONS

The subject application is a continuation application of U.S. patent application with Ser. No. 13/750,368, filed on Jan. 25, 2013, the entire content of which is herein incorporated by reference.

BACKGROUND

Web sites that may have a certain amount of content may store the content, e.g., in a Web Content Management (WCM) system. Some WCM systems may include functionality to, e.g., move content through workflows, from draft, to approval, to publish, and then expiration.

Some WCM systems may allow the publishing of content, e.g., onto social media network sites. The WCM system may use a public Application Programming Interface (API) for the social network, and this may occur as part of the workflow. For example, after the content is published to the WCM system's website, the content may be published to a page in one or more of the social media network sites.

BRIEF SUMMARY OF DISCLOSURE

In one implementation, a method, performed by one or more computing devices, comprises assigning, at a computing device, an action to execute on content based upon, at least in part, an occurrence of a statistical event. Statistics associated with a corresponding portion of the content published on one or more websites is received. The occurrence of the statistical event with respect to the corresponding portion of the content is determined based upon, at least in part, receiving the statistics. The action on the content is executed based upon, at least in part, determining the occurrence of the statistical event with respect to the corresponding portion of the content.

One or more of the following features may be included. The action may include preventing the content from expiring. The action may include expiring of the content. The action may include publishing the content on another website. The action may include sending a notification associated with the content. The one or more websites may include one or more social media websites. The statistical event may include a threshold number of acts performed on the corresponding portion of the content.

In another implementation, a computing system includes a processor and a memory configured to perform operations comprising assigning an action to execute on content based upon, at least in part, an occurrence of a statistical event. Statistics associated with a corresponding portion of the content published on one or more websites is received. The occurrence of the statistical event with respect to the corresponding portion of the content is determined based upon, at least in part, receiving the statistics. The action on the content is executed based upon, at least in part, determining the occurrence of the statistical event with respect to the corresponding portion of the content.

One or more of the following features may be included. The action may include preventing the content from expiring. The action may include expiring of the content. The action may include publishing the content on another website. The action may include sending a notification associated with the content. The one or more websites may include one or more social media websites. The statistical event may include a threshold number of acts performed on the corresponding portion of the content.

In another implementation, a computer program product resides on a computer readable storage medium that has a plurality of instructions stored on it. When executed by a processor, the instructions cause the processor to perform operations comprising assigning an action to execute on content based upon, at least in part, an occurrence of a statistical event. Statistics associated with a corresponding portion of the content published on one or more websites is received. The occurrence of the statistical event with respect to the corresponding portion of the content is determined based upon, at least in part, receiving the statistics. The action on the content is executed based upon, at least in part, determining the occurrence of the statistical event with respect to the corresponding portion of the content.

One or more of the following features may be included. The action may include preventing the content from expiring. The action may include expiring of the content. The action may include publishing the content on another website. The action may include sending a notification associated with the content. The one or more websites may include one or more social media websites. The statistical event may include a threshold number of acts performed on the corresponding portion of the content.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
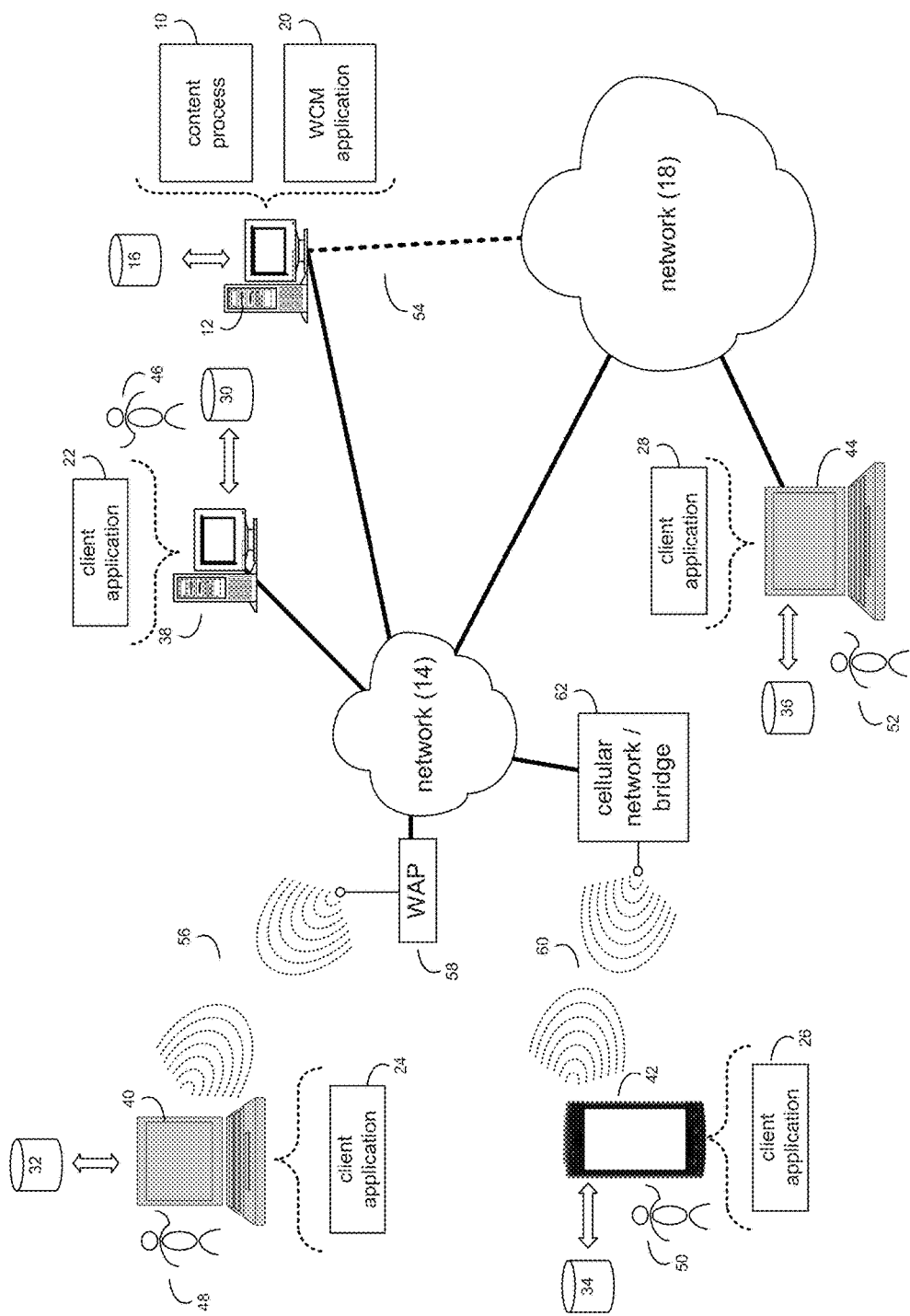
FIG. 1 is an illustrative diagrammatic view of a content process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown content process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, content process 10 may assign, at a computing device, an action to execute on content based upon, at least in part, an occurrence of a statistical event. Statistics associated with a corresponding portion of the content published on one or more websites may be received. The occurrence of the statistical event with respect to the corresponding portion of the content may be determined based upon, at least in part, receiving the statistics. The action on the content may be executed based upon, at least in part, determining the occurrence of the statistical event with respect to the corresponding portion of the content.

The instruction sets and subroutines of content process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Content process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a content management application (e.g., content management application 20), examples of which may include, but are not limited to, e.g., a web content management (WCM) system application, a web site (e.g., social network) application, or other application that allows for management of data on or between one or more web sites. Content process 10 and/or content management application 20 may be accessed via client applications 22, 24, 26, 28. Content process 10 may be a stand alone application, or may be an applet/application/script that may interact with and/or be executed within content management application 20 and/or one or more of client applications 22, 24, 26, 28. Content management application 20 may be a stand alone application, or may be an applet/application/script that may interact with and/or be executed within content process 10 and/or one or more of client applications 22, 24, 26, 28. One or more of client applications 22, 24, 26, 28 may be a stand alone application, or may be an applet/application/script that may interact with and/or be executed within content process 10 and/or content management application 20. Examples of client applications 22, 24, 26, 28 may include, but are not limited to, e.g., a web content management (WCM) system application, a web site (e.g., social network) application, or other application that allows for management of data on or between one or more web sites, a standard and/or mobile web browser, an email client application, a textual and/or a graphical user interface, a customized web browser, a plugin, application programming interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of content process 10 (and vice versa). Accordingly, content process 10 may be a purely server-side application, a purely client-side application, or a hybrid server-side/client-side application that is cooperatively executed by one or more of client applications 22, 24, 26, 28 and/or content process 10.

One or more of client applications 22, 24, 26, 28 may be configured to effectuate some or all of the functionality of content management application 20 (and vice versa). Accordingly, content management application 20 may be a purely server-side application, a purely client-side application, or a hybrid server-side/client-side application that is cooperatively executed by one or more of client applications 22, 24, 26, 28 and/or content management application 20. As one or more of client applications 22, 24, 26, 28, content process 10, and content management application 20, taken singly or in any combination, may effectuate some or all of the same functionality, any description of effectuating such functionality via one or more of client applications 22, 24, 26, 28, content process 10, content management application 20, or combination thereof, and any described interaction(s) between one or more of client applications 22, 24, 26, 28, content process 10, content management application 20, or combination thereof to effectuate such functionality, should be taken as an example only and not to limit the scope of the disclosure.

Users 46, 48, 50, 52 may access computer 12 and content process 10 directly through network 14 or through secondary network 18. Further, computer 12 may be connected to network 14 through secondary network 18, as illustrated with phantom link line 54. Content process 10 may include one or more user interfaces, such as browsers and textual or graphical user interfaces, through which users 46, 48, 50, 52 may access content process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
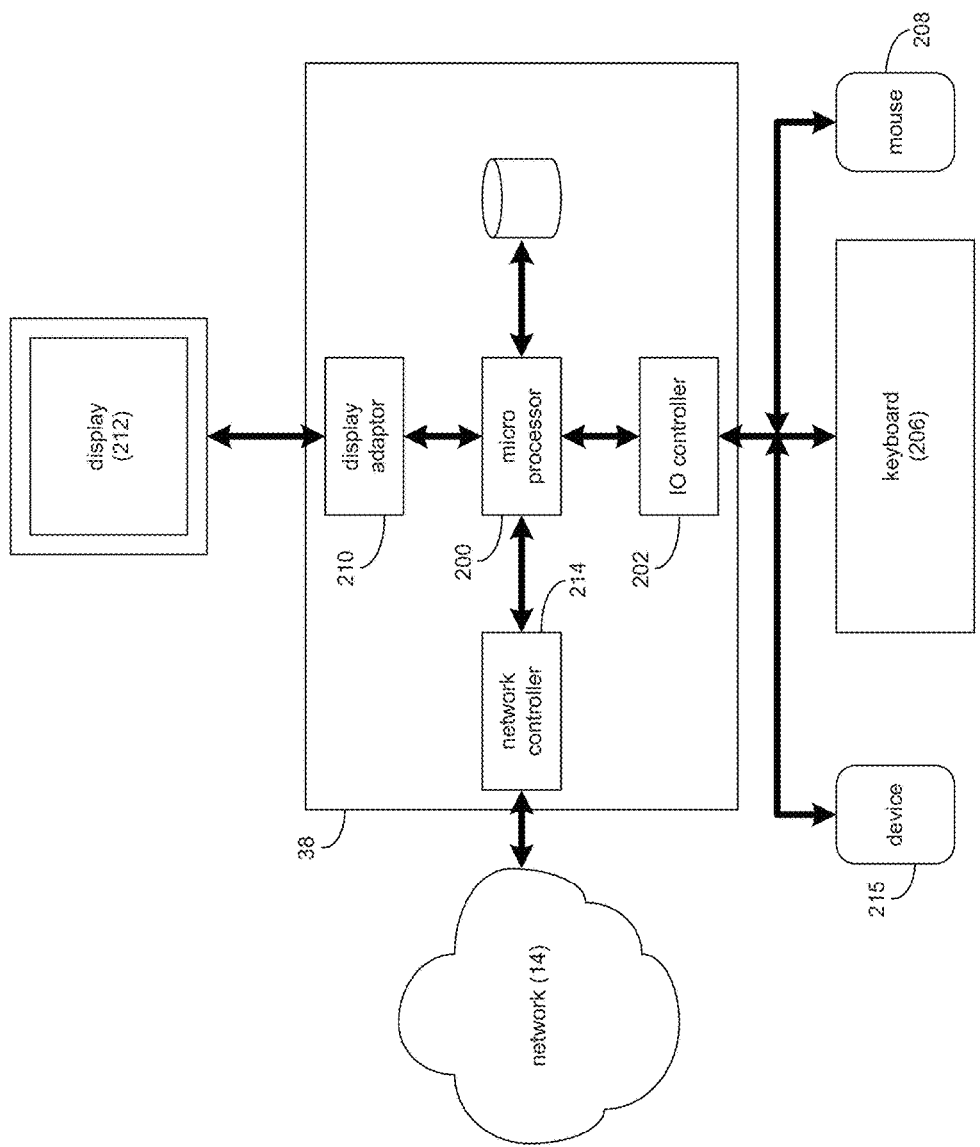
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, content process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
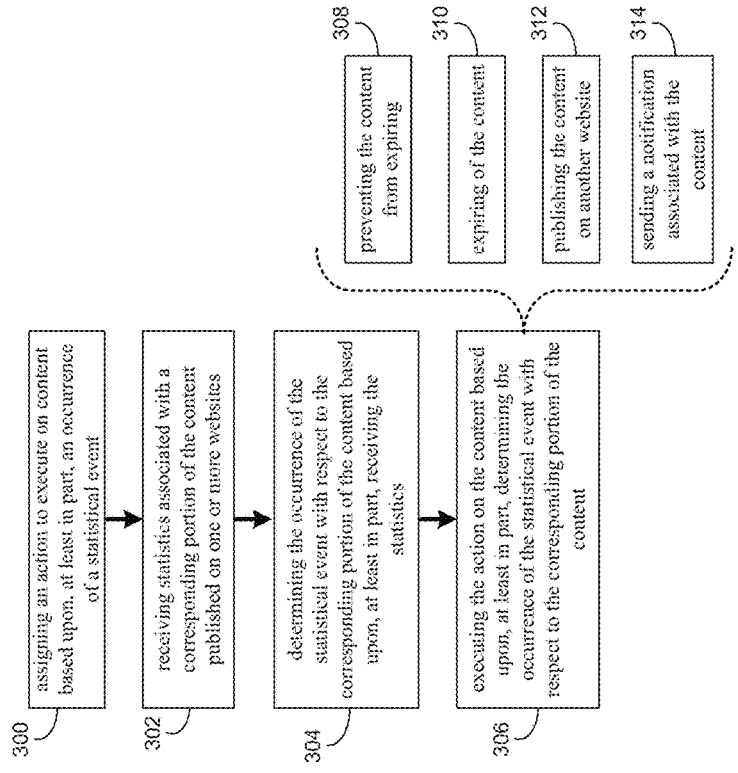
FIG. 3 is an illustrative flowchart of the content process of FIG. 1 according to one or more implementations of the present disclosure.
Figure 4:
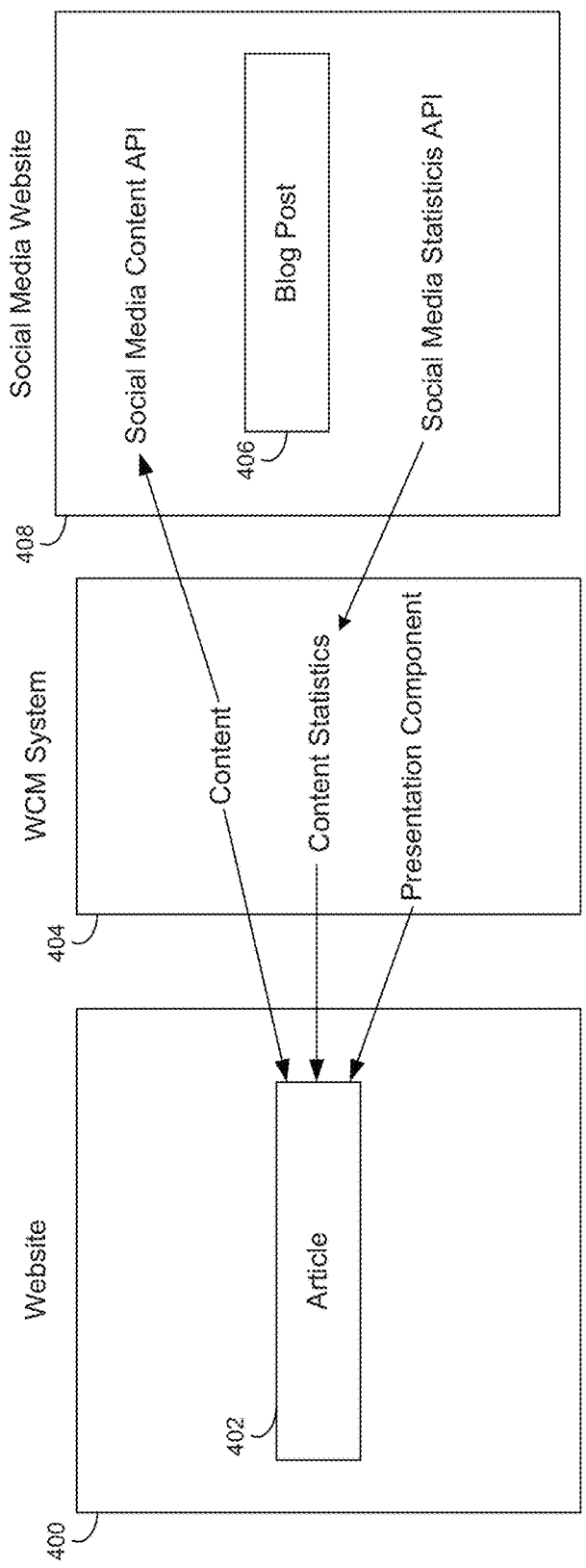
FIG. 4 is an alternative view of the diagrammatic view of the distributed computing network of FIG. 1 according to one or more implementations of the present disclosure.
Figure 5:
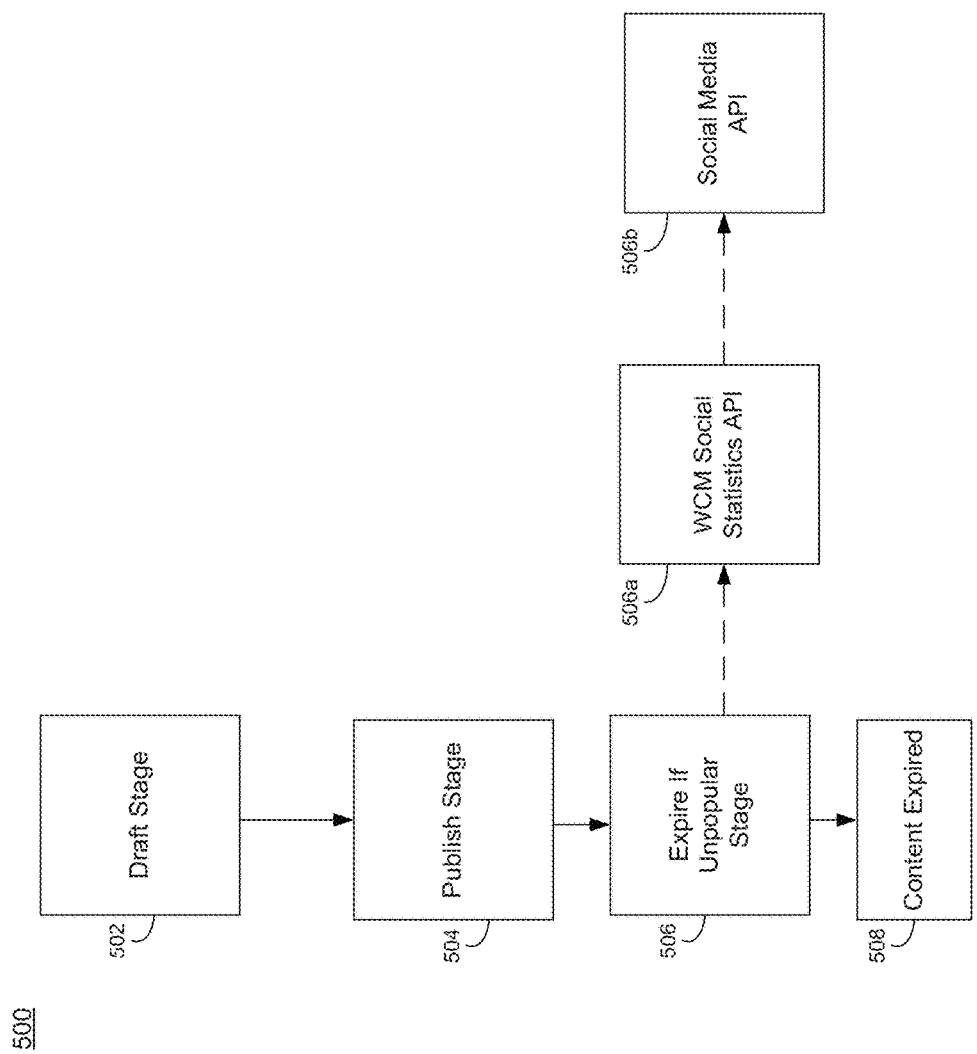
FIG. 5 is an illustrative workflow of the content process of FIGS. 1 and 4 according to one or more implementations of the present disclosure.

The Content Process:

As discussed above and referring also to FIGS. 3-5, content process 10 may assign 300, at a computing device, an action to execute on content based upon, at least in part, an occurrence of a statistical event. Statistics associated with a corresponding portion of the content published on one or more websites may be received 302, e.g., by content process 10. The occurrence of the statistical event with respect to the corresponding portion of the content may be determined 304 by content process 10 based upon, at least in part, receiving the statistics. The action may be executed 306 on the content by content process 10 based upon, at least in part, determining the occurrence of the statistical event with respect to the corresponding portion of the content.

In some implementations, content process 10 may assign 300, at a computing device (e.g., client electronic device 38), an action to execute on content based upon, at least in part, an occurrence of a statistical event. For instance, assume for example purposes only that on website 400, company Y (e.g., via content process 10, client application 22, content management application 20, or combination thereof) has posted content (e.g., article 402) about a new product X, where the content being posted may be managed by a web content management (WCM) system 404.

In some implementations, statistics associated with a corresponding portion of the content published on one or more websites may be received 302, e.g., by content process 10. In some implementations, the one or more websites may include one or more social media websites. For instance, assume for example purposes only that that the content of article 402 from WCM system 404 and/or website 400 has a corresponding portion (e.g., blog post 406) of article 402 posted on social media website 408. The corresponding portion (e.g., blog post 406) may, for example, include all, or a portion (e.g., an excerpt), of the content of article 402, reference to article 402 (e.g., a link to article 402 on website 400, etc.), and/or may otherwise relate to, reference, and/or include at least a portion of the content published on the one or more websites (e.g., of article 402 published on website 400, in the illustrative example). It will be appreciated that websites other than social media websites and those websites not managed by WCM systems may be used without departing from the scope of the disclosure.

In some implementations, and continuing with the above example, the statistical event may include a threshold number of acts performed on the corresponding portion of the content (e.g., blog post 406). For example, the threshold number of acts performed on blog post 406 may include, e.g., 20 users of social media website 408 "liking" and/or sharing of blog post 406 via social media website 408. As such, in the example, content process 10 may receive 302 (e.g., at WCM system 404) the statistics of how many different users have "liked" and/or shared blog post 406. Other acts giving rise to statistical events, such as but not limited to views, reblogs, references (e.g., link to blog post 406), statistical events per time period (e.g., likes per week), may also be used without departing from the scope of the disclosure.

In some implementations, the occurrence of the statistical event with respect to the corresponding portion of the content may be determined 304 by content process 10 based upon, at least in part, receiving 302 the statistics. For instance, if it is assumed for example purposes only that the statistical event is when 20 users "like" blog post 406, content process 10 may use the received 302 statistics of how many users have "liked" blog post 406 to determine 304 whether or not the statistical event of having 20 users "like" blog post 406 has occurred. It will be appreciated that other statistical events may also be used singly or in any combination without departing from the scope of the disclosure.

In some implementations, the action on the content may be executed 306 by content process 10 based upon, at least in part, determining 304 the occurrence of the statistical event with respect to the corresponding portion of the content. For instance, the statistics associated with the corresponding portion of the content published on one or more websites may be used by content process 10 to dynamically control the presentation of website 400. For instance, in some implementations, article 402 may have, e.g., a workflow, such as workflow 500, that may include a custom workflow stage. The custom workflow stage may contain code that looks up the above-noted social media statistics, e.g., via the WCM APIs at WCM social statistics API stage 506a. The WCM APIs may provide access to a cache (not shown) of social media statistics on a given piece of content, such as blog post 406 that corresponds to article 402. The statistics may be periodically updated by, e.g., content process 10 accessing the APIs of the social media sites (e.g., social media API stage 506b). As noted above, any social media statistics and/or any combination of the social media statistics from any social media sources may cause content process 10 to execute 306 the custom workflow stage action that determine the workflow of the content (e.g., article 402).

For example, in some implementations, the action may include content process 10 preventing 308 the content from expiring. For instance, assume for example purposes only that article 402 is set to expire (e.g., be removed from website 400, be archived, etc.) after a given period of time (e.g., 3 days from being posted). In the example, if content process 10 receives 302 statistics showing that 20 users have "liked" blog post 406 and determined 304 that the statistical event of having 20 users "like" blog post 406 has occurred, then content process 10 may prevent 308 article 402 from expiring (e.g., "Expire if Unpopular" stage 506) from website 400.

In some implementations, the action may include content process 10 expiring 310 of the content. For example, if content process 10 receives 302 statistics showing that 19 users have "liked" blog post 406 and determined 304 that the statistical event of having 20 users "like" blog post 406 has not occurred (e.g., within 3 days), then content process 10 may expire 310 article 402 (e.g., "Content Expired" stage 508) from website 400. In some implementations, even if content process 10 has determined 304 that the statistical event of having 20 users "like" blog post 406 has occurred at a time $T_0$, but that after the next 3 days (e.g., time $T_1$), content process 10 has determined 304 that the statistical event of having 20 users (e.g., the same users, different users, or combination thereof) "like" blog post 406 during time period $T_1$ has not occurred, then content process 10 may expire 310 article 402 from website 400. It will be appreciated that after the first statistical event of having 20 users "like" blog post 406, the next statistical event may be more or less than having 20 users "like" blog post 406.

In some implementations, the action may include content process 10 publishing 312 the content on another website. For example, if content process 10 receives 302 statistics showing that 20 users have "liked" blog post 406 and determined 304 that the statistical event of having 20 users "like" blog post 406 has occurred, then content process 10 may publish 312 article 402 (e.g., "Publish Stage" 504) on, e.g., another website (or web page of the same website), such as another social media website, republishing on website 400, republishing on website 400, as well as other websites.

In some implementations, the action may include content process 10 sending 314 a notification associated with the content. For instance, assume for example purposes only that article 402 has been published on website 400 and blogged about via blog post 406 on social media website 408. In the example, content process 10 may receive 302 statistics showing that 20 users have "liked" blog post 406, which may indicate that article 402 is "popular" on social media website 408. Content process 10 may (e.g., via WCM application 20) determine that a second article (not shown), which may be in a draft and not yet published, is "similar" to article 402 using various techniques (e.g., the second article is targeted for the same area of website 400, the second article has the same category and/or keywords, etc.). Further in the example, the second article may be expedited by being automatically published by content process 10, and/or content process 10 may send 314 an email to the author or approver to expedite the publishing of the second article. As another example, if content process 10 receives 302 statistics showing that 20 users have "liked" blog post 406 and determined 304 that the statistical event of having 20 users "like" blog post 406 has occurred, then content process 10 may send 314 a notification (e.g., email, text, etc.) to, e.g., the author of article 402. For example, article 402 may only be in the draft stage (e.g., "Draft Stage" 502) on website 400 (e.g., not yet visible to the public). The notification may include an email to the author of article 402 or a supervisor responsible for reviewing article 402 before it is published to the public on website 400. Such a notification may encourage article 402 to be reviewed in a timelier manner, since there is interest shown in the corresponding content (e.g., blog post 406). In some implementations, even if article 402 may only be in the draft stage on website 400, if content process 10 receives 302 statistics showing that 20 users have "liked" blog post 406 and determined 304 that the statistical event of having 20 users "like" blog post 406 has occurred, then content process 10 may bypass the review process and, as noted above, publish 312 article 402 on website 400 (or elsewhere). In some implementations, e.g., as part of the workflow of article 402, the notification may include an email to the author to provide, e.g., updates, to article 402 and/or blog post 406, encourage the author to produce another article of a similar nature, or a follow up article, etc.

In some implementations, content process 10 (e.g., via WCM application 20) may render the most "popular" content first, e.g., in a list. For instance, an article with 100 user "likes" may be shown first, where another article with 90 user "likes" may be second, and so on. As such, any particular description of rendering and performing action on content should be taken as an example only and not to limit the scope of the disclosure.

While example actions have been described above, it will be appreciated that other actions may also be executed 306 on the content (e.g., article 402) without departing from the scope of the disclosure. For example, other action may include, but are not limited to, creating another version of the article, moving and/or copying the article to another part of website 400, editing the article, assigning the article to a category or associating a keyword with the article, initiate a further action to take place at some point in the future (e.g., if the article has not expired, reevaluate whether the article should be expired a week later). As such, any of the above-noted actions should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
    assigning, at a computing device, an action to execute on a first content item based upon, at least in part, an occurrence of a statistical event;
    receiving statistics associated with a corresponding portion of the first content item published on one or more websites;
    determining the occurrence of the statistical event with respect to the corresponding portion of the first content item based upon, at least in part, receiving the statistics; and
    executing the action on the content based upon, at least in part, determining the occurrence of the statistical event with respect to the corresponding portion of the first content item, wherein the action includes bypassing a review of the first content item based upon, at least in part, the occurrence of the statistical event, and publishing the first content item, and sending a notification associated with the first content item, wherein sending the notification includes emailing an author of the first content item to at least one of update the first content item and the corresponding portion of the first content item, and publish a second content item relative to the first content item.

2. The computer-implemented method of claim 1 wherein the action includes expiring of the first content.

3. The computer-implemented method of claim 1 wherein the action includes publishing the first content on another website.

4. The computer-implemented method of claim 1 wherein the one or more websites include one or more social media websites.

5. The computer-implemented method of claim 1 wherein the statistical event includes a threshold number of acts performed on the corresponding portion of the first content.

6. The computer-implemented method of claim 1 wherein the action includes publishing the second content item on the one or more websites.

* * * * *

UNITED STATES PATENT AND TRADEMARK OFFICE
CERTIFICATE OF CORRECTION

Page 1 of 1

PATENT NO. : 10,382,247 B2
APPLICATION NO. : 14/067059
DATED : August 13, 2019
INVENTOR(S) : David de Vos et al.

It is certified that error appears in the above-identified patent and that said Letters Patent is hereby corrected as shown below:

On the Title Page

Item [72], should read as follows:
David de Vos, Melrose Park (AU);
William J. Izard, Sydney (AU)

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*